(12) United States Patent
Huang et al.

(10) Patent No.: US 11,960,332 B2
(45) Date of Patent: *Apr. 16, 2024

(54) ELECTRONIC DEVICE

(71) Applicant: Acer Incorporated, New Taipei (TW)

(72) Inventors: Yi-Ta Huang, New Taipei (TW);
Cheng-Nan Ling, New Taipei (TW);
Wu-Chen Lee, New Taipei (TW);
Wen-Chieh Tai, New Taipei (TW);
Kun-You Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,654

(22) Filed: Nov. 30, 2022

(65) Prior Publication Data

US 2023/0090418 A1 Mar. 23, 2023

Related U.S. Application Data

(63) Continuation of application No. 17/348,794, filed on Jun. 16, 2021, now Pat. No. 11,550,368, which is a continuation of application No. 16/718,199, filed on Dec. 18, 2019, now Pat. No. 11,068,032.

(30) Foreign Application Priority Data

Apr. 12, 2019 (TW) .................................. 108204527

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1652* (2013.01); *H04M 1/0268* (2013.01)

(58) Field of Classification Search
CPC ............................ G06F 1/1652; G06F 1/1681
See application file for complete search history.

(56) References Cited

U.S. PATENT DOCUMENTS

| 6,577,496 | B1* | 6/2003 | Gioscia | ............... | H04M 1/0216 |
| | | | | | 455/344 |
| 9,348,450 | B1* | 5/2016 | Kim | ..................... | H04M 1/0268 |
| 11,068,032 | B2* | 7/2021 | Huang | .................. | H04M 1/022 |
| 11,550,368 | B2* | 1/2023 | Huang | .................. | G06F 1/1616 |
| 2011/0286157 | A1* | 11/2011 | Ma | ........................ | G06F 1/1652 |
| | | | | | 361/679.01 |

(Continued)

FOREIGN PATENT DOCUMENTS

| CN | 105491193 B | * | 4/2013 | .......... H04M 1/0266 |
| CN | 208702897 | * | 4/2019 | .......... H04M 1/0266 |

*Primary Examiner* — Adrian S Wilson
(74) *Attorney, Agent, or Firm* — JCIPRNET (57) ABSTRACT

An electronic device including a hinge module, a first body, a second body, and a flexible display assembled to the first body and the second body is provided. Each of the first body and the second body is pivoted and slidably connected to the hinge module, and a cover of the hinge module is exposed out of the first body and the second body. The first body and the second body are rotated relatively via the hinge module to bend or flatten the flexible display, when the flexible display is bending from a flat state, a bending portion of the flexible display leans against the cover and pushes the cover away from the first body and the second body.

11 Claims, 8 Drawing Sheets

(56) References Cited

U.S. PATENT DOCUMENTS

| | | | | |
|---|---|---|---|---|
| 2012/0002360 A1* | 1/2012 | Seo | G06F 1/1652 | 361/679.01 |
| 2012/0236484 A1* | 9/2012 | Miyake | G06F 1/1641 | 361/679.01 |
| 2013/0021762 A1* | 1/2013 | van Dijk | H04M 1/022 | 361/749 |
| 2013/0037228 A1* | 2/2013 | Verschoor | G06F 1/1652 | 160/377 |
| 2013/0342090 A1* | 12/2013 | Ahn | G06F 1/1616 | 312/258 |
| 2014/0042293 A1* | 2/2014 | Mok | G06F 1/1679 | 248/682 |
| 2015/0233162 A1* | 8/2015 | Lee | G06F 1/1641 | 16/223 |
| 2015/0241925 A1* | 8/2015 | Seo | G06F 1/1652 | 361/679.27 |
| 2015/0257289 A1* | 9/2015 | Lee | G06F 1/1652 | 361/749 |
| 2019/0086965 A1* | 3/2019 | Kuramochi | G06F 1/1652 | |
| 2019/0098783 A1* | 3/2019 | Zhang | G09F 9/301 | |
| 2019/0141849 A1* | 5/2019 | Xu | G09F 9/301 | |

\* cited by examiner

ELECTRONIC DEVICE

CROSS-REFERENCE TO RELATED APPLICATION

This application is a continuation application of and claims the priority benefit of U.S. application Ser. No. 17/348,794, filed on Jun. 16, 2021. The prior U.S. application Ser. No. 17/348,794 is a continuation application of and claims the benefit of U.S. application Ser. No. 16/718,199, filed on Dec. 18, 2019, which claims the priority benefit of Taiwan application serial no. 108204527, filed on Apr. 12, 2019. The entirety of each of the above-mentioned patent applications is hereby incorporated by reference herein and made a part of this specification.

BACKGROUND

Technical Field

The disclosure is related to an electronic device.

Description of Related Art

With the advancement of technology, the flexible display technology is gradually maturing and considered to have a strong development potential. In general, the flexible display technology includes electronic paper, flexible organic light-emitting diode (OLED), etc. Furthermore, in view of functional requirements such as bending, folding, extending, etc. of the display device for portable electronic device, the application of flexible display technology on portable electronic device is very diverse. At the same time, with the application of flexible material in the field of electronic display, the electronic display device may not only be displayed in a larger area when extended, but may also be folded when required to facilitate portability.

However, corresponding to the extending and folding of device mechanism on the flexible display device, a flexible (soft) display panel on the flexible display device also correspondingly changes in shape and size due to the flexible characteristic thereof. For example, the flexible display panel may have an extra or a reduced length relative to the device mechanism due to difference in degrees of bending (flattening). If the design is performed with mechanical characteristics of existing electronic device, it will not only cause inconvenience in use, but may also cause the display panel to deviate from the original position, thereby resulting in creasing or even falling off from the mechanism. Therefore, there is an urgent need in the field to improve on the mechanism of existing flexible display device, so as to adapt to the trend in technology development and market demands.

SUMMARY

The disclosure provides an electronic device to meet the unfolding and folding requirements of a flexible display.

The electronic device of the disclosure includes a hinge module, a first body, a first linking assembly, a second body, and a second linking assembly. The hinge module has a first rotating shaft, a second rotating shaft, a first guiding shaft, and a second guiding shaft. The first rotating shaft is parallel to the second rotating shaft, the first guiding shaft is orthogonal to the first rotating shaft, and the second guiding shaft is orthogonal to the second rotating shaft. The first body is slidably assembled to the first guiding shaft, and the first linking assembly is slidably assembled to the first guiding shaft and connected to the first body. The second body is slidably assembled to the second guiding shaft, and the second linking assembly is slidably assembled to the second guiding shaft and connected to the second body. The flexible display is disposed on the first body and the second body. The first body and the second body relatively rotate to be folded or unfolded via the hinge module, and are driven by a deformation of the flexible display to move closer to or away from the hinge module.

Based on the above, since the electronic device is configured with the flexible display, in order for the device structure to conform with the deformation requirement of the flexible display, the electronic device makes use of the first guiding shaft configured by the hinge module at the first rotating shaft and the second guiding shaft configured at the second rotating shaft to allow the first body and the second body to be slidably configured at the first guiding shaft and the second guiding shaft respectively. At the same time, the first guiding shaft and the second guiding shaft are each further configured with a first linking assembly and a second linking assembly, and are correspondingly connected to the first body and the second body. Accordingly, the component configuration will cause the first body and the second body to each have a slidable distance, so that a specific route may be moved according to the amount of deformation of the flexible display.

Based on the above, since the first body and the second body may also move relative to the hinge module during rotation of being switched between folded and unfolded, the bodies may be away from the hinge module when the flexible display is in a bent state, so that the space after the bodies are away from the hinge module may accommodate the bending of the flexible display. Also, the bodies and the hinge module may be located on the same plane to support the flexible display together when the flexible display is in a flat state. In this way, the relative motion between the bodies and the hinge module may conform with the deformation requirement of the flexible display, thereby effectively preventing the flexible display from creasing or even falling off.

To make the aforementioned and other features of the disclosure more comprehensible, several embodiments accompanied with drawings are described in detail as follows.

DETAILED DESCRIPTION OF DISCLOSED EMBODIMENTS

Figure 1:
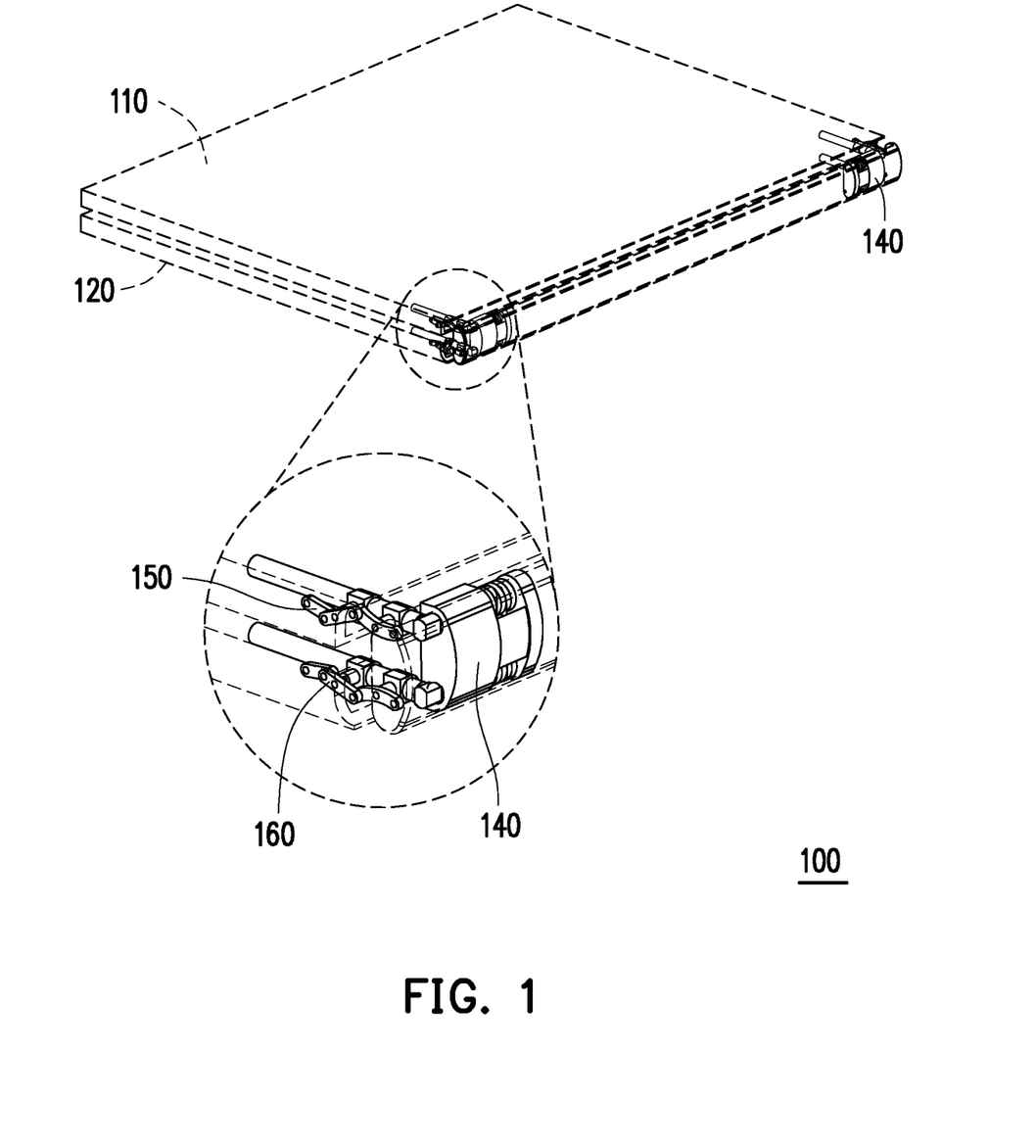
FIG. 1 is a schematic view of an electronic device in accordance with an embodiment of the disclosure.
Figure 2:
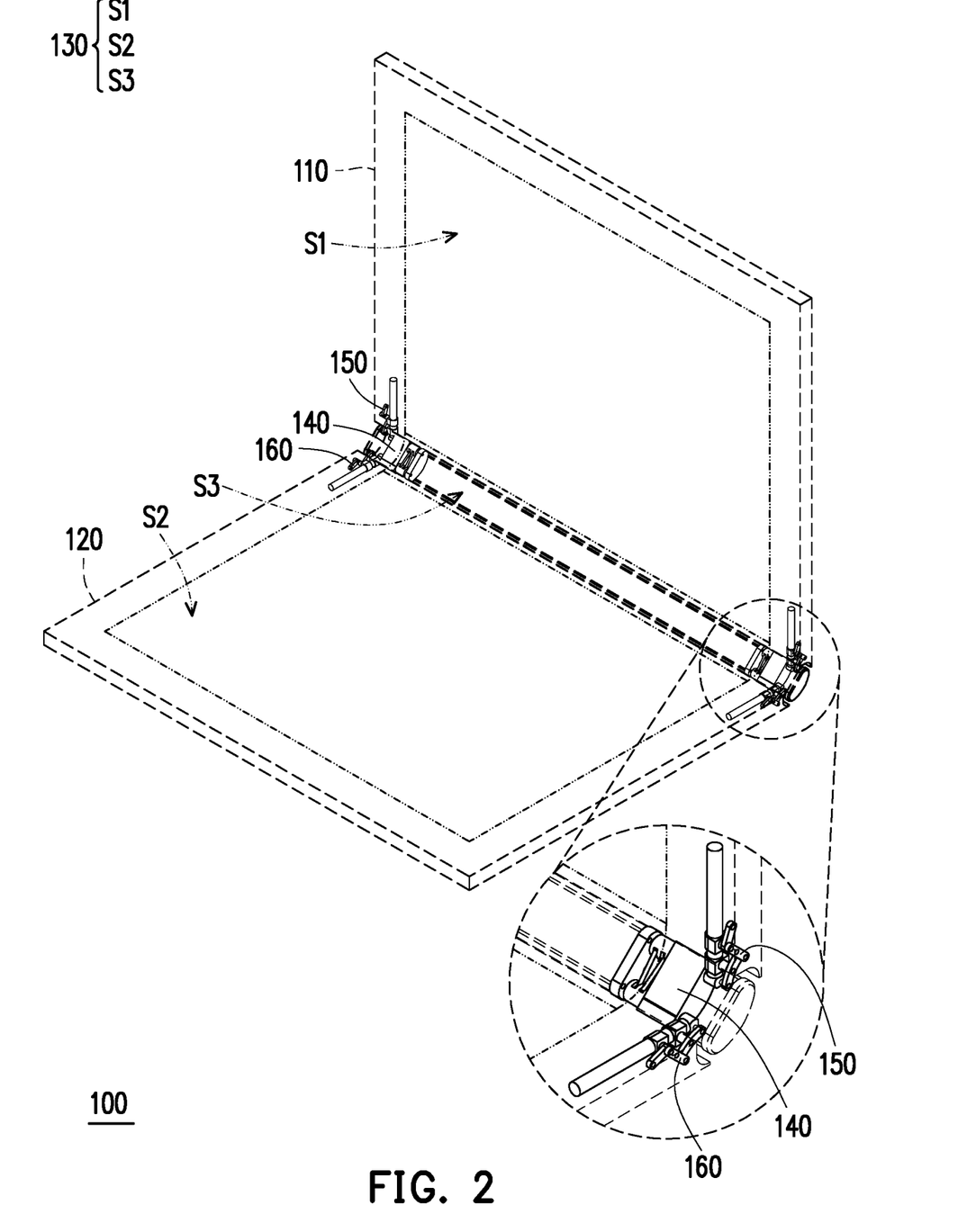
FIG. 2 and FIG. 3 are schematic views of the electronic device of FIG. 1 in different states respectively.
Figure 3:
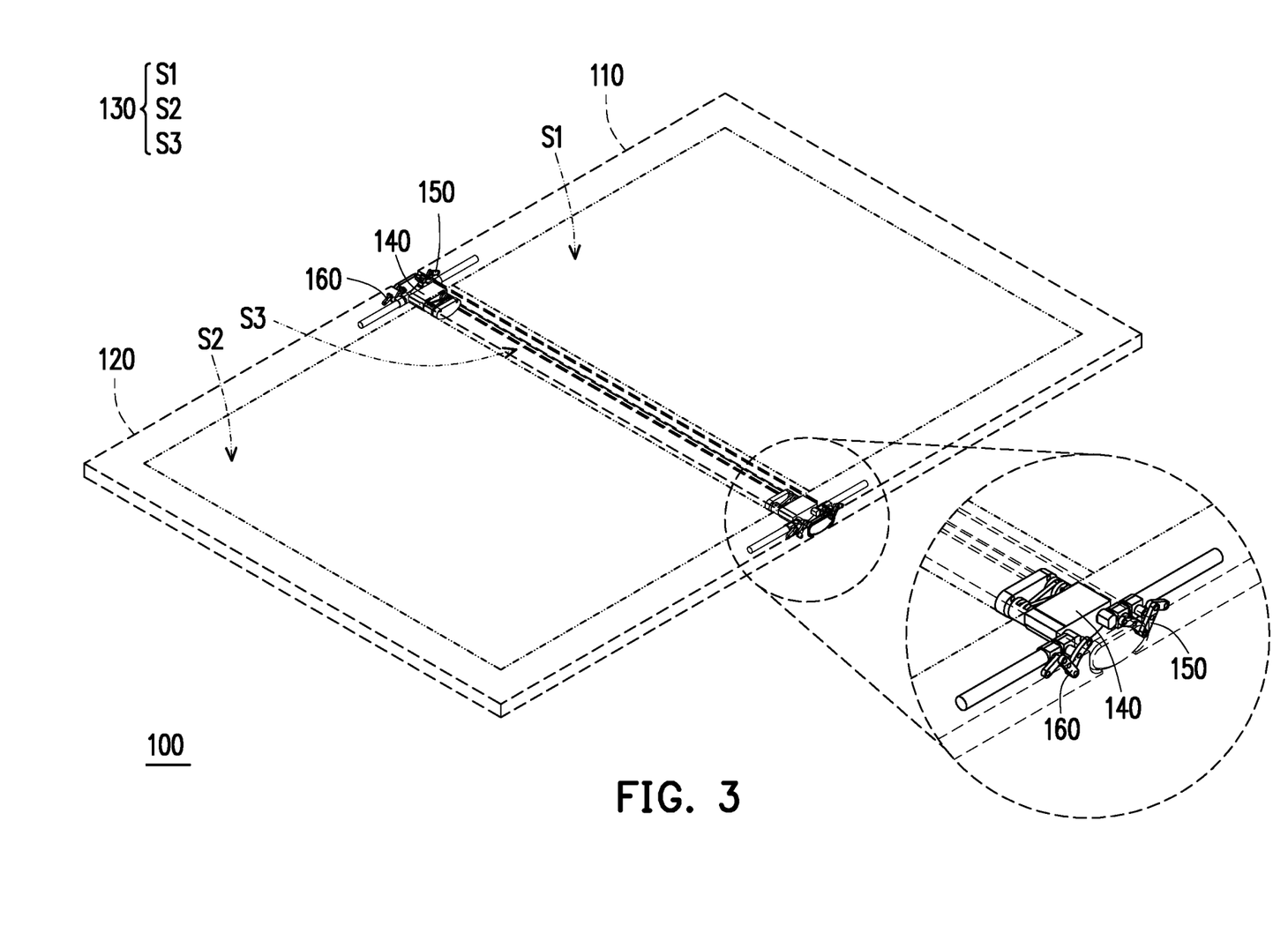

FIG. 1 is a schematic view of an electronic device in accordance with an embodiment of the disclosure. FIG. 2 and FIG. 3 are schematic views of the electronic device of FIG. 1 in different states respectively. Referring to FIG. 1 to FIG. 3 at the same time, in the embodiment, an electronic device 100 is, for example, a handphone, a tablet computer, or a notebook computer, which includes a first body 110, a second body 120, a flexible display 130, and a hinge module 140, wherein the flexible display 130 is disposed on the first body 110 and the second body 120, and the first body 110 and the second body 120 may relatively rotate to be folded or unfolded via the twin shaft mechanism of the hinge module 140. The flexible display 130 presents different deformations with respect to the unfolding and folding states of the first body 110 and the second body 120. Here, the state shown in FIG. 1 is regarded as a bent state of the flexible display 130 and the state shown in FIG. 2 is regarded as a flat state of the flexible display 130.

As mentioned above, the flexible characteristic of the flexible display 130 causes the flexible display 130 to have size variations with respect to different deformations. If existing hinge technology is adopted, the opening and closing locations of the bodies will be different from the deformation state of the flexible display, thereby causing the flexible display to crease or even fall off.

Figure 4A:
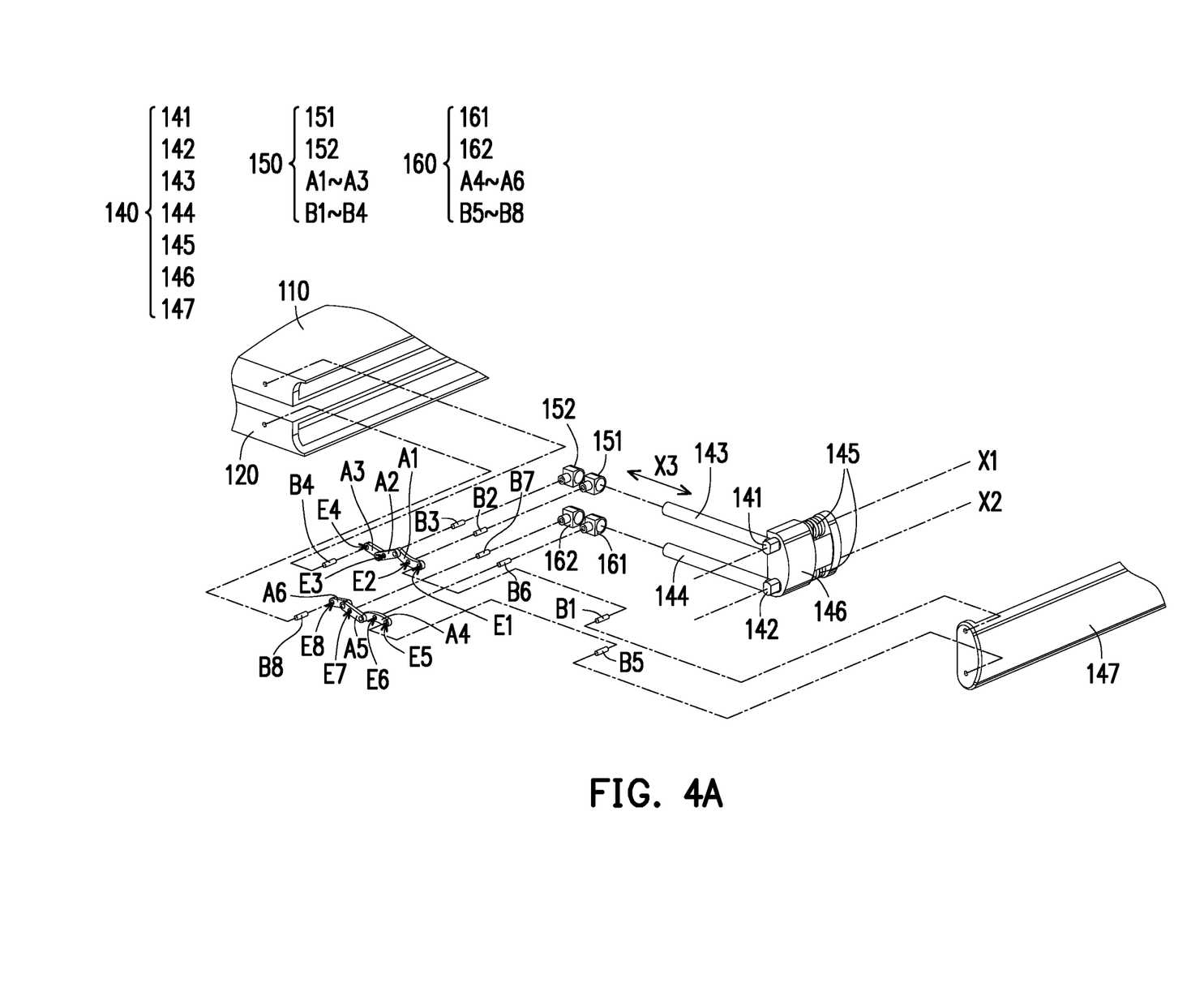
FIG. 4A and FIG. 4B are exploded views of different parts of the electronic device of FIG. 1 respectively.
Figure 4B:
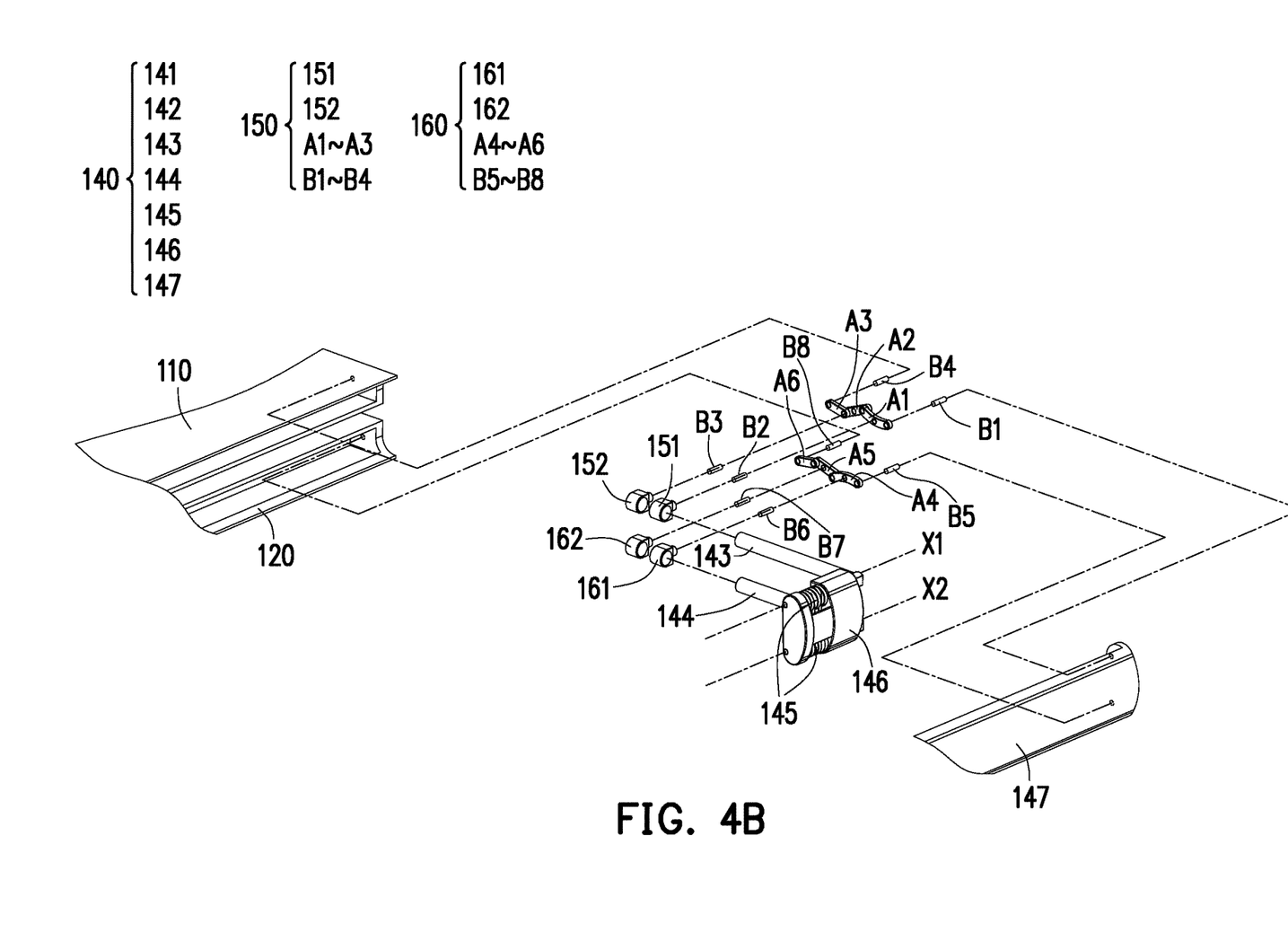

In view of this, FIG. 4A and FIG. 4B are exploded views of different parts of the electronic device of FIG. 1 respectively. Here, in order to clearly identify the hinge module 140, the hinge module 140 is exploded into different drawings. However, since the hinge module 140 is configured in pairs, the components shown in FIG. 4B are consistent with the components shown in FIG. 4A. Following up, descriptions will be mainly based on FIG. 4A. In the electronic device 100 of the embodiment, the hinge module 140 has a first guiding shaft 143 and a second guiding shaft 144 in addition to a first rotating shaft 141 and a second rotating shaft 142 used for rotational unfolding and folding, so that the first body 110 is slidably assembled to the first guiding shaft 143 and the second body 120 is slidably assembled to the second guiding shaft 144. Furthermore, the electronic device 100 further includes a first linking assembly 150 and a second linking assembly 160, wherein the first linking assembly 150 is slidably assembled to the first guiding shaft 143 and connected to the first body 110, and the second linking assembly 160 is slidably assembled to the second guiding shaft 144 and connected to the second body 120.

In detail, the hinge module 140 further includes a torsion assembly 145, a structure 146, and a cover 147. The first rotating shaft 141 and the second rotating shaft 142 are respectively inserted into the structure 146 to connect to the torsion assembly 145. When the first rotating shaft 141 and the second rotating shaft 142 respectively rotates about axial directions X1 and X2, the torsion assembly 145 generates a friction with the first rotating shaft 141 and the second rotating shaft 142 to provide the torque required to support the bodies. Here, the configuration of the torque assembly 145, the first rotating shaft 141, and the second rotating shaft 142 may be obtained from existing technology, which shall not be reiterated.

It should be noted that in the hinge module 140 of the embodiment, the first rotating shaft 141, the second rotating shaft 142, the first guiding shaft 143, the second guiding shaft 144, the torsion assembly 145, and the structure 146 are configured in pairs, so the following descriptions will be based on only one of the pairs, while descriptions of the other one will be omitted due to the pair being the same and symmetrically configured. Next, the components are accommodated in the cover 147 after being assembled.

As shown in FIG. 4A, the first rotating shaft 141 and the second rotating shaft 142 are parallel to each other (the axial direction X1 is parallel to the axial direction X2), the first guiding shaft 143 is orthogonal to the first rotating shaft 141, and the second guiding shaft 144 is orthogonal to the second rotating shaft 142. Also, in the embodiment, the first guiding shaft 143 and the first rotating shaft 141 are regarded as an integral structure, that is, the first guiding shaft 143 is extended and turned from the first rotating shaft 141, and the second guiding shaft 144 and the second rotating shaft 142 are regarded as an integral structure, that is, the second guiding shaft 144 is extended and turned from the second rotating shaft 142. In the state shown in FIG. 1 and FIG. 4A, the first guiding shaft 143 and the second guiding shaft 144 have a consistent sliding direction X3.

Furthermore, the first linking assembly 150 includes a first sleeve 151, a second sleeve 152, and a plurality of first linking members A1 to A3. The first sleeve 151 and the second sleeve 152 are slidably configured at the first guiding shaft 143, and the first linking members A1 to A3 are serially hinged to one other, wherein the hinge direction is parallel to the first rotating shaft 141 (the axial direction X1) and the second rotating shaft 142 (the axial direction X2). The first linking member A1 is hinged to the first sleeve 151, the first linking member A2 is hinged to the second sleeve 152, the first linking member A3 is hinged to the first body 110, and the first linking member A1 is hinged to the cover 147 of the hinge module 140. Further, the first linking members A1 to A3 have a plurality of hinge points E1 to E4 corresponding to the first sleeve 151, the second sleeve 152, the first body 110, and the cover 147, and the hinging action is completed by using hinge pins B1 to B4.

Similarly, the second linking assembly 160 includes a third sleeve 161, a fourth sleeve 162, and a plurality of second linking members A4 to A6. The third sleeve 161 and the fourth sleeve 162 are slidably configured at the second guiding shaft 144, and the second linking members A4 to A6 are serially hinged to one other, wherein the hinge direction is parallel to the first rotating shaft 141 (the axial direction X1) and the second rotating shaft 142 (the axial direction X2). The second linking member A4 is hinged to the third sleeve 161, the second linking member A5 is hinged to the fourth sleeve 162, the second linking member A6 is hinged to the second body 120, and the second linking member A4 is hinged to the cover 147 of the hinge module 140. Further, the second linking members A4 to A6 have a plurality of hinge points E5 to E8 corresponding to the third sleeve 161, the fourth sleeve 162, the second body 120, and the cover 147, and the hinging action is completed by using hinge pins B5 to B8.

Here, the first sleeve 151 is located between the second sleeve 152 and the hinge module 140, a hinge point of the first linking member A3 and the first body 110 is adjacent to the second sleeve 152, the third sleeve 161 is located between the fourth sleeve 162 and the hinge module 140, and a hinge point of the second linking member A6 and the second body 120 is adjacent to the fourth sleeve 162.

Based on the above, with the configuration of the first linking assembly 150 and the second linking assembly 160 corresponding to the first body 110, the second body 120, and the hinge module 140, the first body 110 and the second body 120 are expected to generate a relative movement with the hinge module 140 according to the deformation state of the flexible display 130.

Figure 5A:
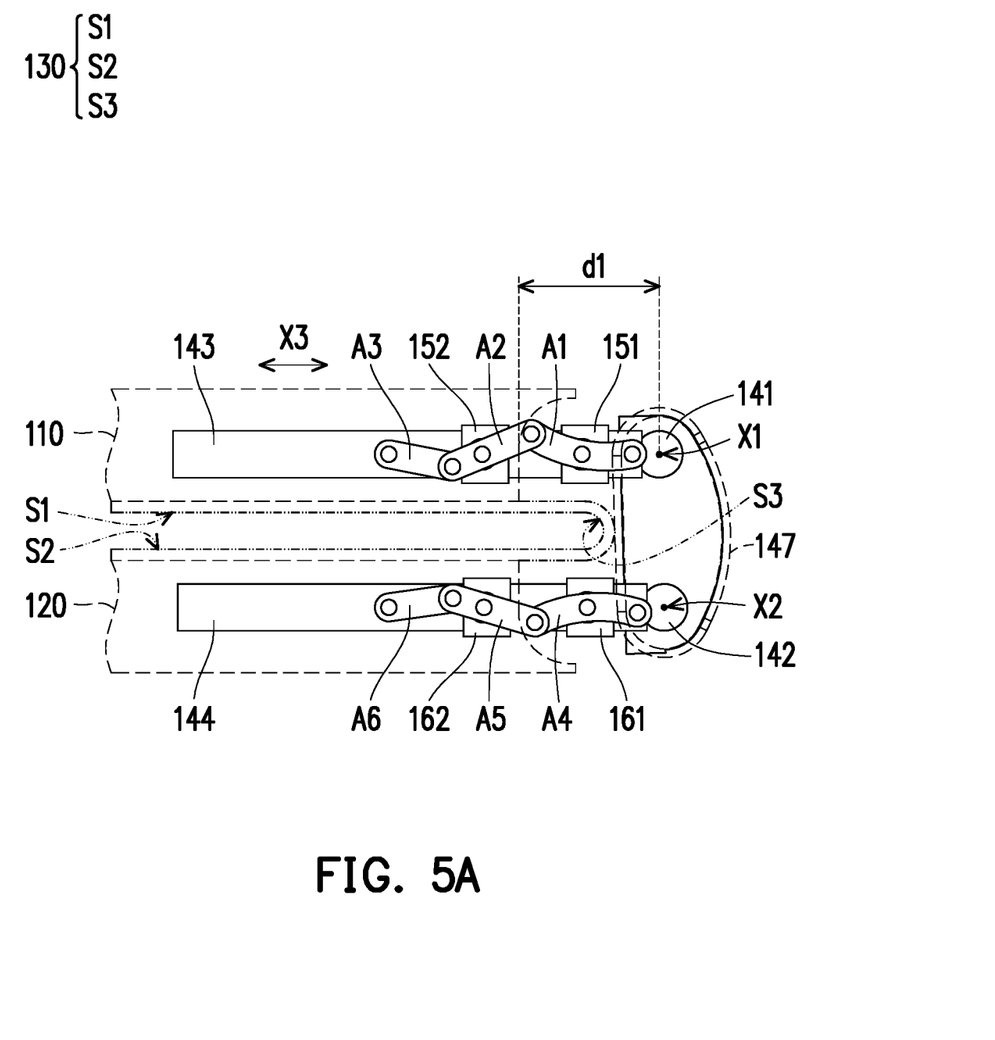
FIG. 5A to FIG. 5C are partial side views corresponding to FIG. 1 to FIG. 3 respectively.
Figure 5B:
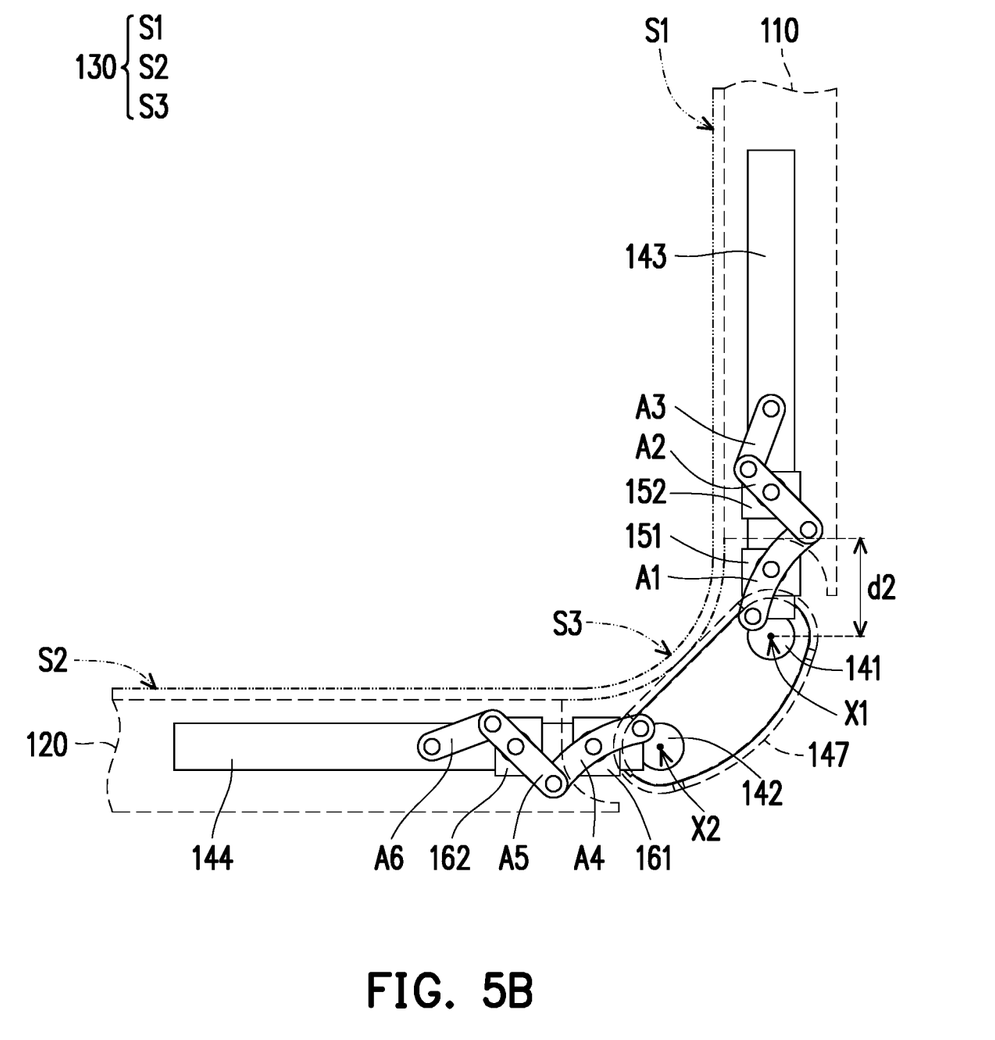
Figure 5C:
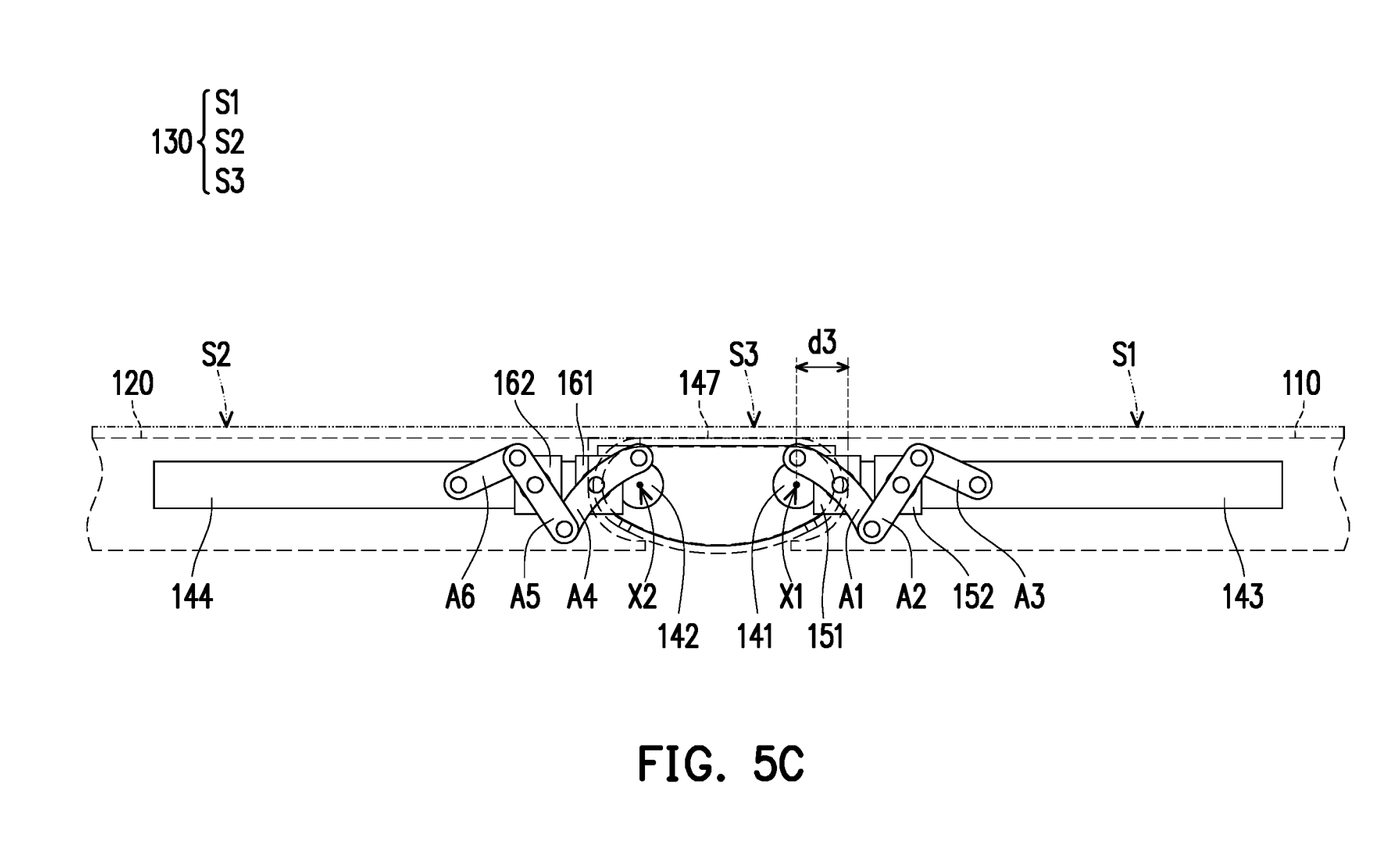

FIG. 5A to FIG. 5C are partial side views corresponding to FIG. 1 to FIG. 3 respectively. Referring to FIG. 5A to FIG. 5C at the same time, in the embodiment, the display surface of the flexible display 130 is further divided into a first portion S1, a second portion S2, and a third portion S3, wherein the first portion S1 is disposed with the first body 110, the second portion S2 is disposed with the second body 120, and the third portion S3 is adjacent between the first portion S1 and the second portion S2. The first body 110 and the second body 120 are configured according to the relevant components, and have a relative movement with the hinge module 140, that is, the first body 110 and the second body 120 may be regarded as having a distance to slide freely along the axial direction X3.

First, when the first body 110 and the second body 120 are folded relative to each other, as shown in FIG. 5A (corresponding to FIG. 1), the flexible display 130 is in the bent state, the first portion S1 and the second portion S2 are opposite to each other, and the third portion S3 is bent, the bending of the third portion S3 may be accommodated between the hinge module 140 and the first body 110 and the second body 120 while the first body 110 and the second body 120 are away from the rotating shafts 141 and 142 of the hinge module 140.

Next, sequentially switching from FIG. 5A to FIG. 5B to FIG. 5C represents switching the electronic device 100 from a folded state to an unfolded state, that is, the flexible display 130 is switched from the bent state to the flat state. Since the deformation of the flexible display 130 (from being bent to flattened) generates size variations, a deformation force thereof drives the first body 110 and the second body 120 to correspondingly slide along the first slide shaft 143 and the second slide shaft 144. Meanwhile, driven by the first linking members A1 to A3, the first sleeve 151 and the second sleeve 152 will slide along the first guiding shaft 143 to restrict the sliding route of the first body 110. Also, driven by the second linking members A4 to A6, the third sleeve 161 and the fourth sleeve 162 will slide along the second guiding shaft 144 to restrict the sliding route of the second body 120. In addition, it can be clearly identified from FIG. 5A to FIG. 5C that the first linking members A1 to A3 and the second linking members A4 to A6 are configured in a symmetrical contour. Therefore, the sliding route of the first sleeve 151, the second sleeve 152, and the first body 110 will be consistent with the sliding route of the third sleeve 161, the fourth sleeve 162, and the second body 120, and the sliding routes may be appropriately designed in accordance with the degree of deformation of the flexible display 130.

It should be noted that during the process of FIG. 5A to FIG. 5C, the distance of the first body 110 and the second body 120 relative to the hinge module 140 changes as a result of the process. A distance d1 (FIG. 5A) is shortened to a distance d2 (FIG. 5B) and further shortened to a distance d3 (FIG. 5C), where the distance d1>the distance d2>the distance d3. In other words, during the unfolding process, the first body 110 and the second body 120 respectively moves closer to the first rotating shaft 141 and the second rotating shaft 142 from the opposite sides of the hinge module 140 to generate a contraction-like action until the flat state shown in FIG. 5C. At this time, the first body 110, the hinge module 140, and the second body 120 are on the same plane, and the flexible display 130 may be stably supported by the first body 110, the hinge module 140, and the second body 120, especially for the third portion S3, which may rely on the hinge module 140 to prevent the flexible display 130 from creasing or even falling off at the third portion S3 thereof.

Conversely, when the electronic device 100 is reversely switched from the unfolded state shown in FIG. 5C to the folded state of FIG. 5A, it represents that the flexible display 130 is switched from the flat state to the bent state. Since the third portion S3 will be bent again, during the folding process, the deformation of the flexible display 130 will drive the first body 110 and the second body 120 to slide along the corresponding first guiding shaft 143 and second guiding shaft 144. Also, the first body 110 and the second body 120 will slide to the corresponding first sleeve 151, second sleeve 152, third sleeve 161, and fourth sleeve 162 via the first linking members A1 to A3 and the second linking members A4 to A6, so that the first body 110 and the second body 120 may be away from the first rotating shaft 141 and the second rotating shaft 142 of the hinge module 140, and the bending formed by the third portion S3 may be smoothly accommodated in the space after the first body 110 and the second body 120 are away from the hinge module 140.

Based on the above, in the above embodiments of the disclosure, since the electronic device is disposed with the flexible display, in order for the device structure to conform with the deformation requirement of the flexible display, the electronic device makes use of the first guiding shaft configured by the hinge module at the first rotating shaft and the second guiding shaft configured at the second rotating shaft to allow the first body and the second body to be slidably configured at the first guiding shaft and the second guiding shaft respectively. At the same time, the first guiding shaft and the second guiding shaft are each further configured with a first linking assembly and a second linking assembly, and are correspondingly connected to the first body and the second body. Accordingly, the component configuration will cause the first body and the second body to each have a slidable distance, so that a specific route may be moved according to the amount of deformation of the flexible display.

In this way, the first body and the second body may also move relative to the hinge module during rotational unfolding and folding such that the bodies may be away from the hinge module when the flexible display is in the bent state, so that the space after the bodies are away from the hinge module may accommodate the bending of the flexible display. Also, the bodies and the hinge module may be located on the same plane to support the flexible display together when the flexible display is in the flat state. The relative motion between the bodies and the hinge module may conform with the deformation requirement of the flexible display, thereby effectively preventing the flexible display from creasing or even falling off.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device comprising:
  a hinge module;
  a first body and a second body, each pivoted and slidably connected to the hinge module, wherein a cover of the hinge module is exposed out of the first body and the second body; and
  a flexible display assembled to the first body and the second body, wherein the first body and the second body are rotated relatively via the hinge module to bend or flatten the flexible display, when the flexible display is bending from a flat state, a bending portion of the flexible display leans against the cover and pushes the cover away from the first body and the second body,
  wherein the hinge module comprises a first guiding shaft and a second guiding shaft each rotated relative to the cover, the first guiding shaft extends from one side of the cover, the second guiding shaft extends from another side of the cover, the first body is slidably assembled to the first guiding shaft, and the second body is slidably assembled to the second guiding shaft.

2. The electronic device according to claim 1, further comprises a first linking assembly and a second linking assembly, the first body is slidably assembled to the first guiding shaft via the first linking assembly, and the second body is slidably assembled to the second guiding shaft via the second linking assembly.

3. The electronic device according to claim 2, wherein the first linking assembly comprises:
a first sleeve and a second sleeve slidably configured at the first guiding shaft;
a plurality of first linking members serially hinged to one another, one of the plurality of first linking members is hinged to the first sleeve, another one of the plurality of first linking members is hinged to the second sleeve, and yet another one of the plurality of first linking members is hinged to the first body,
wherein the second linking assembly comprises:
a third sleeve and a fourth sleeve slidably configured at the second guiding shaft;
a plurality of second linking members serially hinged to one another, one of the plurality of second linking members is hinged to the third sleeve, and another one of the plurality of second linking members is hinged to the fourth sleeve, and yet another one of the plurality of second linking members is hinged to the second body,
wherein when the first body and the second body are relatively rotated to be folded or unfolded such that the flexible display is switched between a bent state and the flat state, a deformation force of the flexible display drives the first body to move along the first guiding shaft and drives the second body to move along the second guiding shaft, and drives the first sleeve and the second sleeve to slide along the first guiding shaft, and drives the third sleeve and the fourth sleeve to slide along the second guiding shaft via the plurality of first linking members and the plurality of second linking members.

4. The electronic device according to claim 3, wherein one of the plurality of first linking members and one of the plurality of second linking members are hinged to the hinge module.

5. The electronic device according to claim 3, wherein the first sleeve is located between the second sleeve and the hinge module, a hinge point of one of the plurality of first linking members and the first body is adjacent to the second sleeve, the third sleeve is located between the fourth sleeve and the hinge module, and a hinge point of one of the plurality of second linking members and the second body is adjacent to the fourth sleeve.

6. The electronic device according to claim 3, wherein the plurality of first linking members connected in series and the plurality of second linking members connected in series are configured in a symmetrically contour.

7. The electronic device according to claim 1, wherein the hinge module further has a first rotating shaft and a second rotating shaft, disposed in the cover and located at the sides of the cover, the first rotating shaft is parallel to the second rotating shaft, the first guiding shaft is orthogonal to the first rotating shaft, and the second guiding shaft is orthogonal to the second rotating shaft.

8. The electronic device according to claim 7, wherein when the first body and the second body are folded relative to each other, the first body and the second body are sliding away from the first rotating shaft and the second rotating shaft, and the flexible display is in a bent state, wherein when the first body and the second body are unfolded relative to each other, the first body and the second body respectively moves closer to the first rotating shaft and the second rotating shaft from opposite sides of the first rotating shaft and the second rotating shaft, and the flexible display is in the flat state.

9. The electronic device according to claim 1, wherein the first body and the second body have a distance relative to the cover, the distance is variable, and the distance when the flexible display is in a bent state is greater than the distance when the flexible display is in the flat state.

10. The electronic device according to claim 1, wherein the first body, the hinge module, and the second body are on a same plane to support the flexible display when the flexible display is in the flat state, wherein the bending portion is flattened and supported by the cover.

11. The electronic device according to claim 1, wherein a display surface of the flexible display comprises a first portion, a second portion, and a third portion, the third portion is adjacent between the first portion and the second portion, the first portion is configured at the first body, the second portion is configured at the second body, the third portion forms a bending when the flexible display is in a bent state, and the bending is accommodated in a space after the first body and the second body are away from the hinge module, wherein the third portion is the bending portion.

\* \* \* \* \*